United States Patent [19]
Kawada

[11] Patent Number: 5,873,287
[45] Date of Patent: Feb. 23, 1999

[54] TRANSMISSION FOR SELF-PROPELLED WALKING LAWN MOWERS

[75] Inventor: Hirohiko Kawada, Amagasaki, Japan

[73] Assignee: Kanzaki Kokyukoki Mfg., Co., Ltd., Hyogo-ken, Japan

[21] Appl. No.: 798,862

[22] Filed: Feb. 11, 1997

[30]  Foreign Application Priority Data

Feb. 15, 1996  [JP]  Japan .................................. 8-027936

[51] Int. Cl.[6] ............................. F16H 57/02; F16H 57/04
[52] U.S. Cl. ............................ 74/606 R; 475/83; 74/417
[58] Field of Search ................................ 74/606 R, 417; 475/83; 60/464, 494, 487, 490, 453, 454, 484, 485; 180/62

[56]  References Cited

U.S. PATENT DOCUMENTS

| | | |
|---|---|---|
| 3,035,385 | 5/1962 | Lill . |
| 4,135,411 | 1/1979 | Alessio . |
| 4,907,401 | 3/1990 | Nemoto et al. . |
| 4,932,209 | 6/1990 | Okada et al. ............................. 60/487 |
| 5,149,311 | 9/1992 | Luijten . |
| 5,156,576 | 10/1992 | Johnson ................................ 74/606 R |
| 5,289,738 | 3/1994 | Szulczewski ................................ 475/83 |
| 5,505,101 | 4/1996 | Curtis . |
| 5,616,092 | 4/1997 | Hauser et al. ............................ 475/83 |

FOREIGN PATENT DOCUMENTS

| | | | |
|---|---|---|---|
| 1552067 | 10/1967 | France ................................. 74/606 R |
| 1037215 | 2/1989 | Japan ................................... 74/606 R |
| 1413672 | 11/1975 | United Kingdom . |

*Primary Examiner*—Vinh T. Luong
*Attorney, Agent, or Firm*—Knobbe, Martens, Olson & Bear, LLP

[57] ABSTRACT

A transmission for self-propelled walking lawn mowers includes a casing, an input shaft inserted into an opening formed in the casing, an output shaft disposed perpendicular to the axis of the input shaft, a drive gear mounted on the input shaft, a drive gear mounted on the output shaft, a power transmission gear mechanism for transmitting drive power from the input shaft to the output shaft, and bearing structures for supporting the input shaft. The bearing structures include a lower supporting structure disposed adjacently below the lower end of the input shaft, and the lower supporting structure includes a supporting member which projects from the inner wall of the casing to a position adjacently below the lower end of the input shaft, wherein a lower-end face of the input shaft and an upper face of the supporting member are engaged to hold the input shaft at its horizontal position, thereby reducing the height of a lawn mower.

6 Claims, 16 Drawing Sheets

TRANSMISSION FOR SELF-PROPELLED WALKING LAWN MOWERS

TECHNICAL FIELD

The present invention relates to a transmission for transmitting rotation of an engine to mower wheels with the rotational speed being reduced, and more particularly to a transmission for use in self-propelled walking lawn mowers.

BACKGROUND OF THE INVENTION

One example of this kind of conventional transmission is shown in FIG. 19. In this type of transmission, an input shaft 101 for receiving drive force from an engine was supported at the upper portion of the casing 102 by two superimposed bearings 103 and 104.

The input shaft 101 could not be extended much downwardly, because the lower end of the input shaft 101 was disposed directly above and perpendicular to the axis of the output shaft 107, on which output shaft a large gear 106 was mounted to mesh with a power transmission gear 105 of the input shaft 101. Further, since it was impossible to support the input shaft 101 stably with only one bearing 104, two bearings had to be mounted in a superimposed manner so as to increase the supporting strength of the input shaft.

However, this prior art transmission the two bearings being superimposed on each other was bulky. Therefore, with this type of transmission, it was impossible to address the need for a compact lawn mower.

DISCLOSURE OF THE INVENTION

The object of the present invention is to provide a transmission for self-propelled walking lawn mowers that have a reduced height dimension, thereby making a whole lawn mower compact.

In order to attain the above object, the transmission of the present invention for self-propelled walking lawn mowers comprises
  a casing;
  an input shaft inserted into an opening formed in the casing;
  an output shaft disposed perpendicular to the axis of the input shaft; and
  a power transmission gear mechanism for transmitting drive power from the input shaft having a drive gear to the output shaft having a drive gear,
  wherein bearing means for supporting the input shaft comprises upper bearing means disposed adjacent to and above the drive gear mounted on the input shaft and lower bearing means disposed adjacent to and below the lower end of the input shaft.

BEST MODE FOR CARRYING OUT THE INVENTION

The first embodiment of the transmission of the present invention for self-propelled walking lawn mowers is described below with reference to FIG. 1–FIG. 18. The present invention is not limited to the embodiments described below, and therefore certain changes and modifications can be made without departing from the scope of the invention as will be apparent to those skilled in the art.

Figure 1:
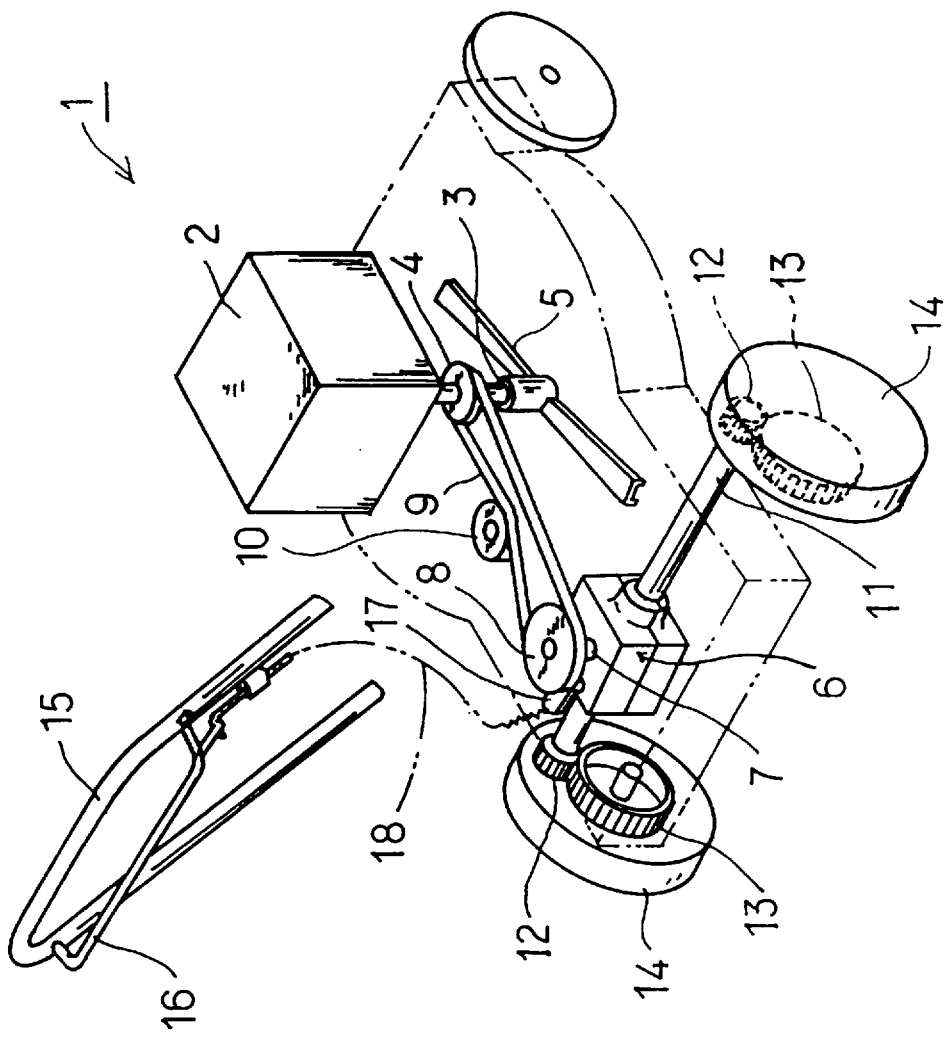
FIG. 1 is a perspective view schematically showing the internal structure of the first embodiment of the transmission of the present invention for self-propelled walking lawn mowers.

FIG. 1 schematically shows the internal structure of a self-propelled walking lawn mower 1. A drive shaft 3 extends downwardly from a drive unit 2. Fixedly mounted on this drive shaft 3 is a pulley 4 and a cutting blade 5. A pulley 8 is fixedly mounted on an input shaft 7 introduced into a transmission 6. A belt 9 is passed through the pulley 8 and the pulley 4. The belt 9 is maintained taut by a tension roller 10. The input shaft 7 is vertically introduced from above the transmission 6. The rotational force transmitted to the output shaft 11 from the input shaft 7 via the transmission 6 is further transmitted to drive wheels 14, 14 via gears 12 and 13. The lawn mower 1 is provided with a handle 15 to which an operating arm 16 is pivotably attached. A clutch arm 17 attached to the transmission 6 is connected to an operating arm 16 via a clutch cable 18 that tightens when the operating arm 16 is grasped together with the handle 15. The details of the internal operation of the clutch are described later.

Figure 2:
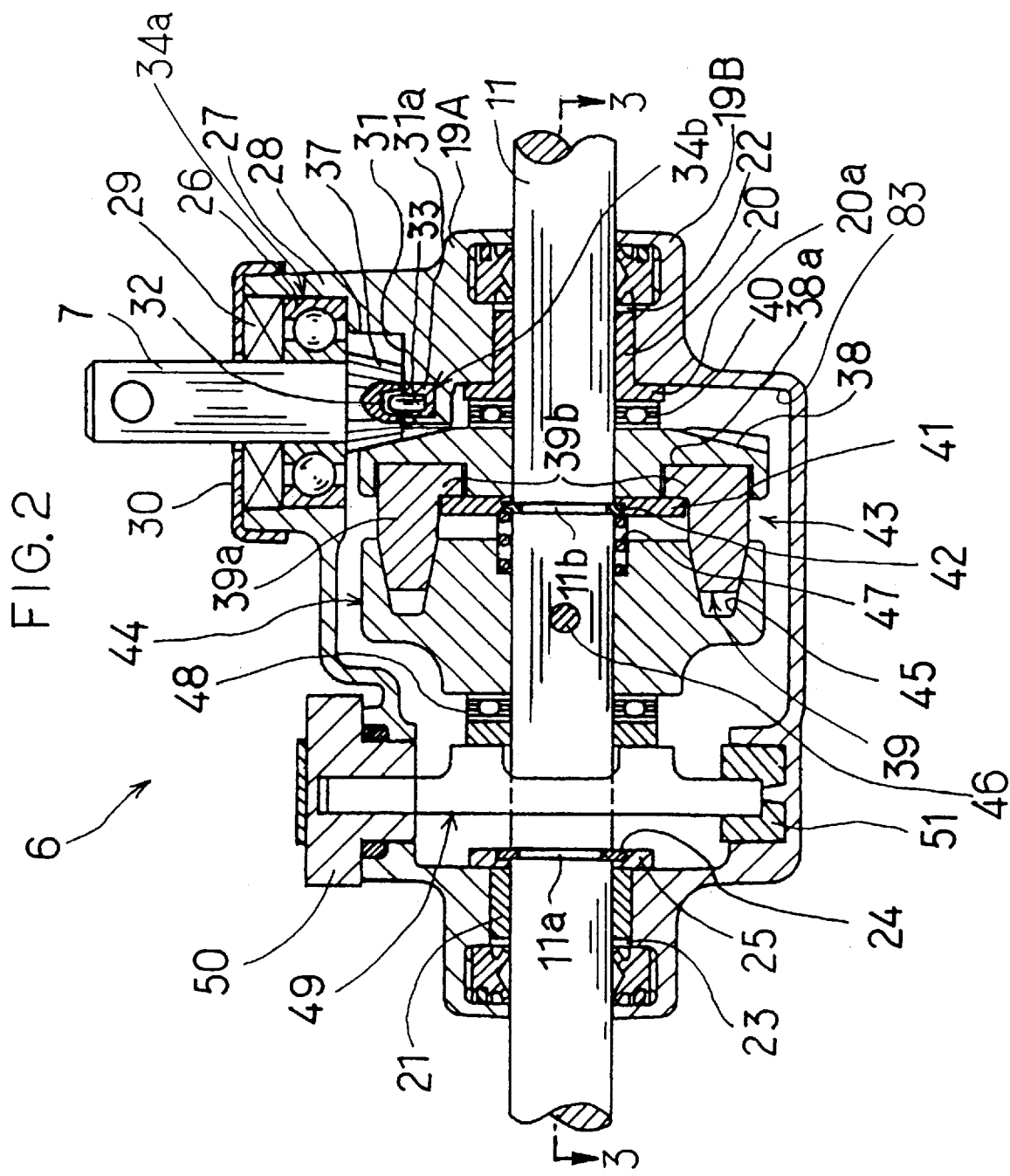
FIG. 2 is a vertical longitudinal cross section taken along the line 2—2 of FIG. 3, schematically showing the internal structure of the first embodiment of the transmission of the present invention for self-propelled walking lawn mowers.
Figure 3:
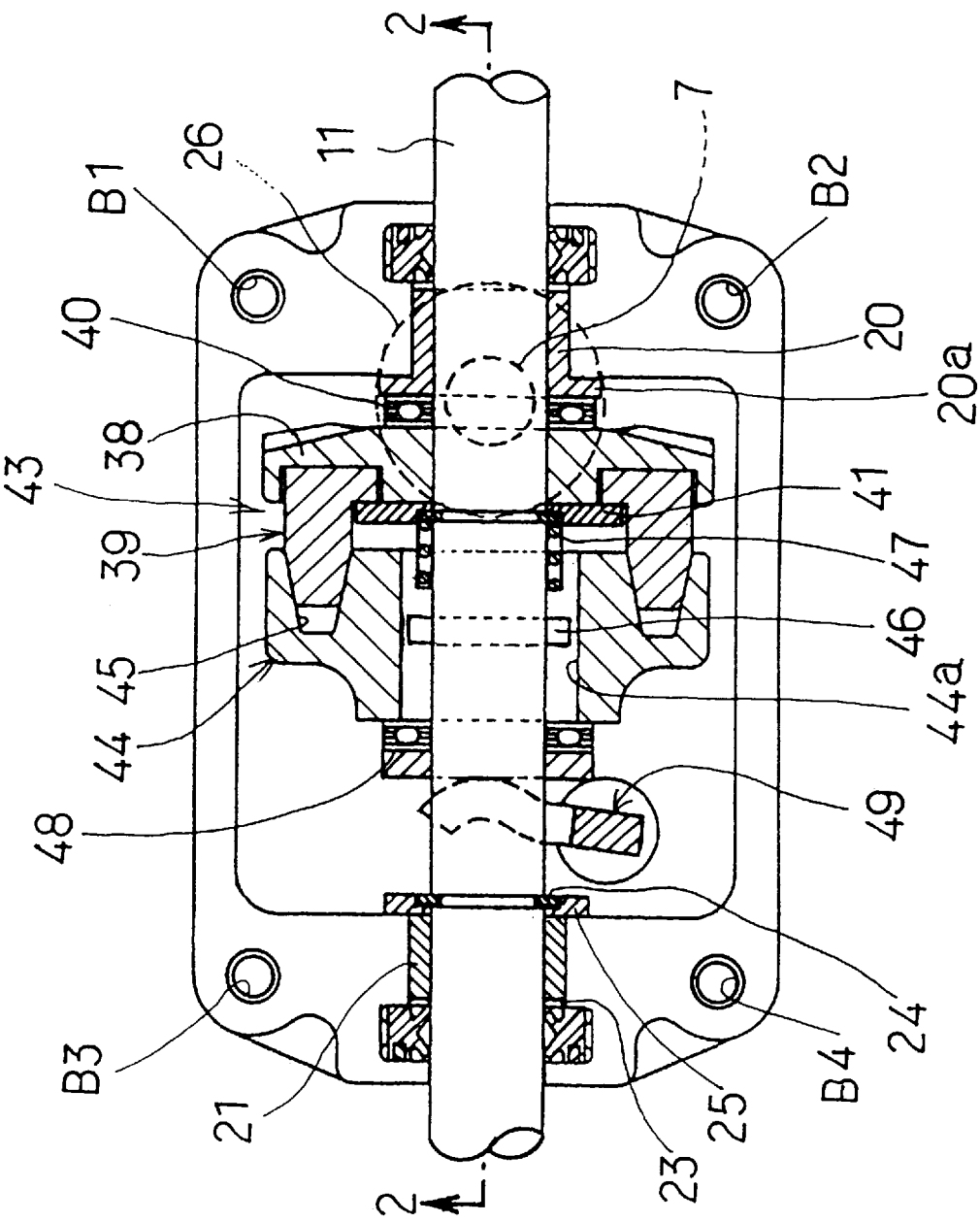
FIG. 3 is a horizontal cross section taken along the line 3—3 of FIG. 2.

As shown in FIGS. 2 and 3, the transmission 6 has a common casing for accommodating its structural components. This casing is constituted by two parts, i.e., an upper casing half 19A and a lower casing half 19B. These casing halves 19A and 19B can be mated along a separating line, which is disposed almost horizontally when the transmission 6 is mounted in place.

Figure 14:
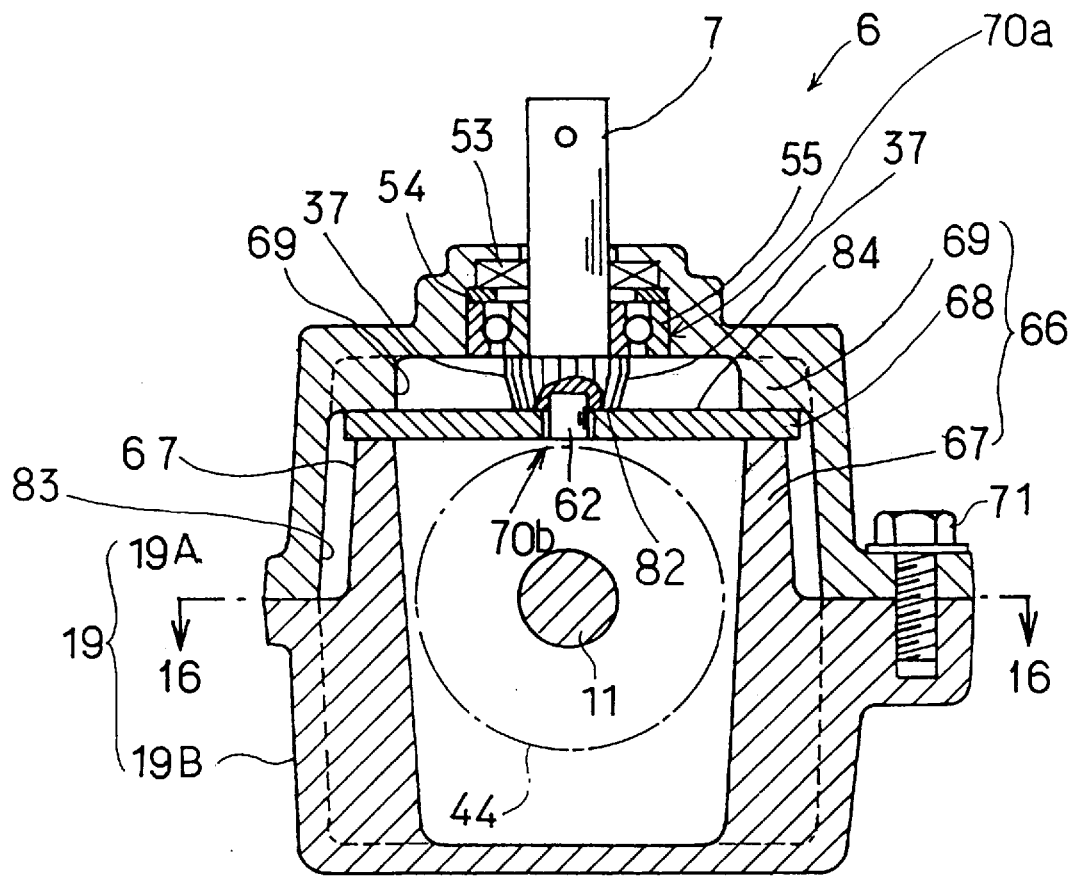
FIG. 14 is a vertical cross section taken along the line 14—14 of FIG. 16, showing the internal structure of the third embodiment of the transmission of the present invention.
Figure 15:
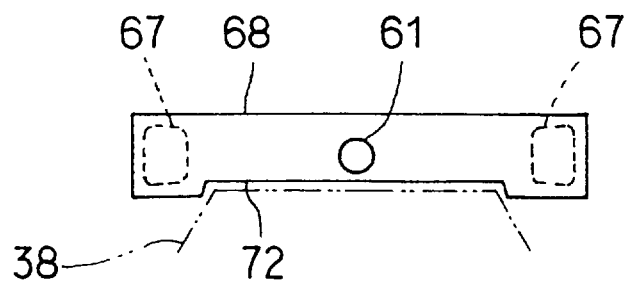
FIG. 15 is a plan view showing the supporting portion of FIG. 14.

The upper and lower casing halves 19A and 19B can be kept mated with bolts being screwed into corresponding holes B1, B2, B3 and B4 that are formed in the peripheral flanges of the casing halves 19A and 19B (see FIG. 14).

The central line of the output shaft 11 is in the plane containing the separating line between the casing halves 19A and 19B. Formed in the mating surfaces of the upper and lower casing halves 19A and 19B are semi-circular recesses 22 and 23 for receiving bushings 20 and 21. The output shaft 11 supports and passes through the bushes 20 and 21. In this embodiment, one bushing 20 is provided with an annular flange 20a that can contact the interior surfaces of both the upper and lower casing halves 19A and 19B. The other bush 21 is held in the recess 23 by a washer 25 that is rotatably attached to the output shaft 11 by a snap ring 24 snapped in a circumferential groove 11a of the output shaft 11. The bushes 20 and 21 may be replaced with another appropriate bearing means. The output shaft 11 is held so as not to move in the axial left-hand direction as in FIGS. 2 and 3 by means of the above-mentioned snap ring 24 and washer 25.

Figure 4:
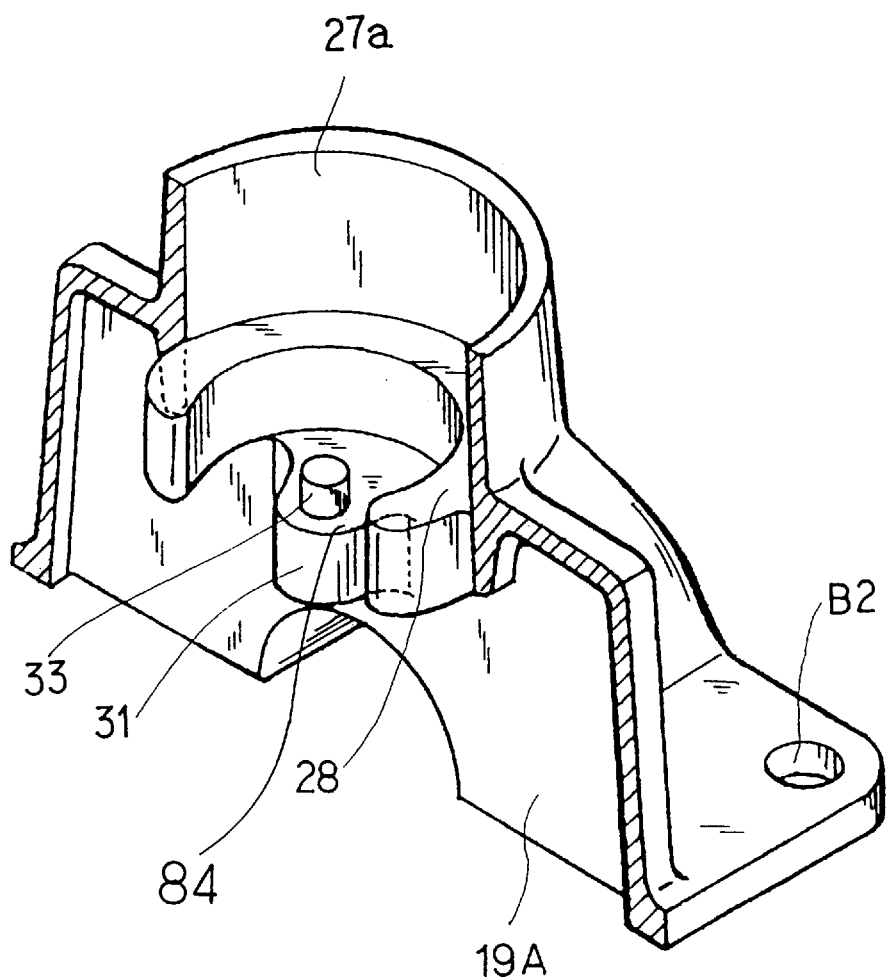
FIG. 4 is an enlarged and partially cutaway perspective view of the bearing means of the transmission of FIG. 2.

The upper casing half 19A is integrally provided with an upwardly extending hollow cylindrical portion 27 (having an opening 27a as indicated in FIG. 4) in the place where the input shaft 7 is inserted. Mounted in and below the hollow part of the cylindrical portion 27 is a bearing structure for the input shaft 7, which comprises an upper bearing structure 34a and a lower supporting structure 34b. In this example, the upper bearing structures 34a comprises a later-described bearing 26, a shoulder 28, and oil seal 29, and a pressure member 30, and the lower supporting structure 34b comprises a supporting member 31, a first engaging means 32 or 35, and a second engaging means 33 or 36 (see FIGS. 6 and 7). Formed below the hollow part of the cylindrical portion 27 is the shoulder 28 (see FIG. 4), which supports the bearing 26 and is formed integrally with the upper casing half 19A. The input shaft 7 is rotatably supported by the bearing 26 in the upper casing half 19A. The oil seal 29 closes the opening 27a (FIG. 4) in the upper casing half 19A with the input shaft 7 passing through the opening 27a. The oil seal 29 is covered with a pressure member 30 that is fixedly attached to the upper casing half 19A.

Figure 5:
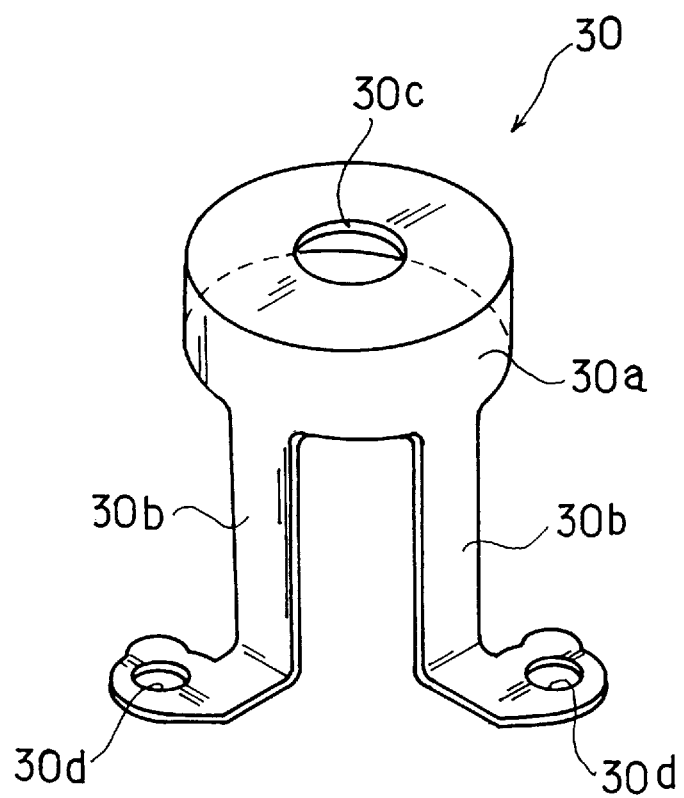
FIG. 5 is an enlarged perspective view of the pressure member of the transmission of FIG. 2.

As shown in FIG. 5, the pressure member 30 is provided with a cap 30a and a pair of legs 30b, 30b each extending from the cap 30a. The cap 30a has an opening 30c for receiving the input shaft 7 at the center of the ceiling portion. Each end of the legs 30b, 30b is bent and provided with a hole 30d which aligns with a bolt hole B1 and B2 when the cap 30a is fitted over the cylindrical portion 27.

Further, as shown in FIG. 2, the upper casing half 19A is integrally provided with a supporting member 31 for receiving the input shaft 7. The supporting member 31 horizontally projects from the inner side wall (83) of the upper casing half 19A. The lower end 81 (having a lower end face 82) of the input shaft 7 contacts the upper face of the supporting member 31 (see FIGS. 6 and 7). A first engaging means 32 is formed at the center of the lower end face of the input shaft 7. The first engaging means 32 loosely engages a correspondingly positioned second engaging means 33, so that the input shaft 31 is held at its horizontal position. The first engaging means 32 may be, for example, a hole formed in the lower end face of the input shaft 7, and the second engaging means 33 may be a projection formed on the supporting member 31. Preferably, the upper end of the second engaging means 33 does not contact the inner top wall of the first engaging means 32, whereby the input shaft 7 is supported by the upper face of the supporting member 31.

Figure 7:
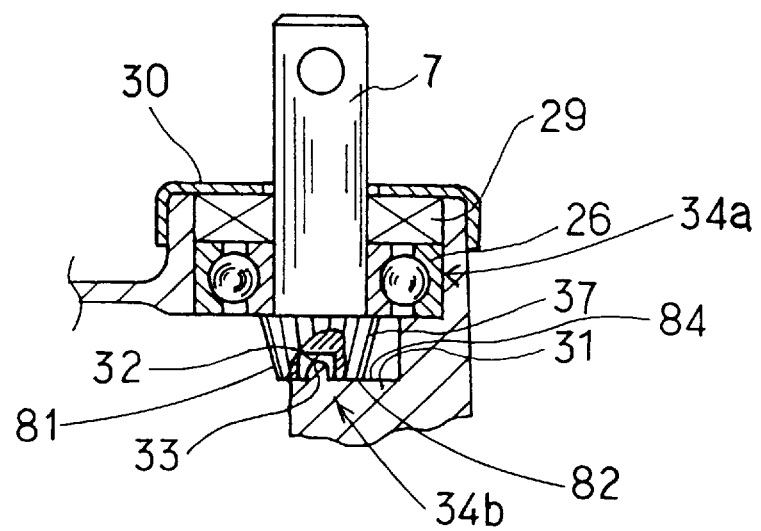
FIG. 7 is an enlarged cross section of still another embodiment of the bearing means of the transmission of FIG. 2.
Figure 8:
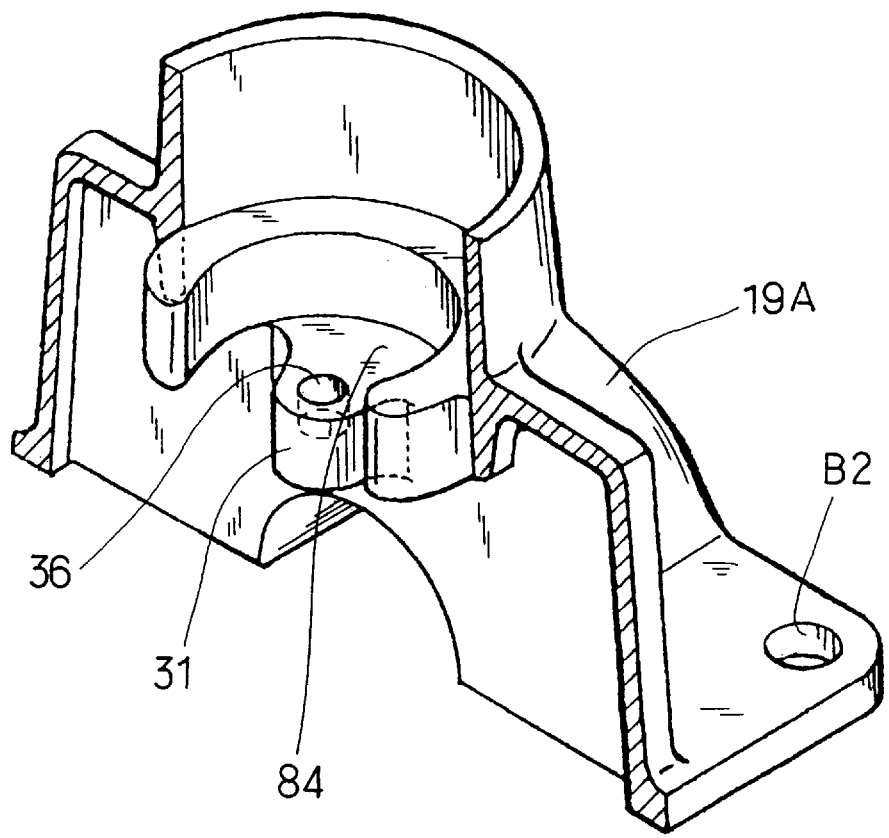
FIG. 8 is a perspective view showing the bearing means of FIG. 6.

The second engaging means 33 can be formed by embedding a pin member directly in the supporting member 31 or alternatively inserting a pin member into a protector 31a embedded in the supporting member 31 as shown in FIG. 2. The second engaging means 33 may also be formed integrally with the supporting member 31 as shown in FIG. 7.

Figure 6:
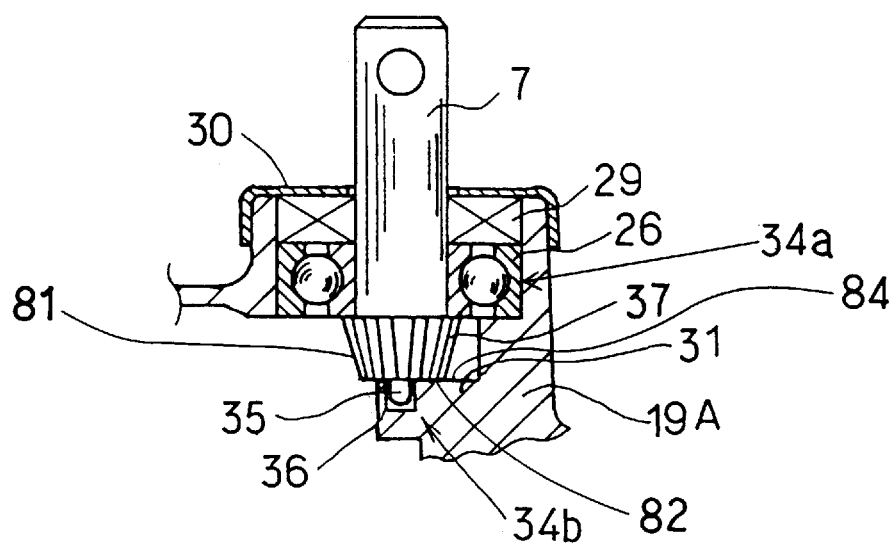
FIG. 6 is an enlarged cross section of another embodiment of the bearing means of the transmission of FIG. 2.

Conversely, as shown in FIG. 6, a projection 35 may be provided on the lower end face of the input shaft 7, and a hole 36 engageable with the projection 35 may be provided on the supporting member 31.

Referring again to FIGS. 2 and 3, the input shaft 7 is disposed perpendicular to the output shaft 11. Both shafts 7 and 11 are connected by a power transmission gear mechanism. This power transmission gear mechanism comprises a drive gear 37 (small gear) integrally mounted on the input shaft 7 or alternatively keyed to the input shaft 7 and a drive gear 38 (large gear) loosely mounted on the output shaft 11.

The small gear 37 is mounted at the lower end of the input shaft 7, i.e., disposed between the supporting member 31 and the bearing 26. The large gear 38 is rotatably fitted to the output shaft 11.

In this embodiment, since the input shaft 7 and the output shaft 11 are arranged perpendicular to each other in the same plane, the small and large gears 37 and 38 are bevel gears. When both shafts are disposed perpendicular to each other, but not contained in the same plane, a hypoid gear transmission mechanism may be used as a power transmission mechanism for transmitting drive force between both shafts 7 and 11.

As shown in FIG. 2, the small gear 37 is mounted on the input shaft 7 in the upper end portion of the upper casing half 19A to mesh with the large gear 38.

A slide bearing 40 fitted to the output shaft 11 contacts the toothed side of the large gear 38. On the other hand, formed in the side opposite to the toothed side of the large gear 38 is at least one recess 38a into which at least one friction member 39 is fitted. The friction member 39 has a main body 39a annularly projecting in the opposite direction to the large gear 38 and an inwardly radially projecting flange 39b at the base portion of the main body. The flange 39b is axially pressed by a washer 41 which is, in turn, pressed by a snap ring 42 snapped in a circumferential groove 11b of the output shaft 11, so that the friction member 39 is prevented from axially moving toward the left-hand side as viewed in FIG. 2. A fixed clutch member 43 is thus constituted. The fixed clutch member 43 is prohibited from moving axially, but permitted to rotate around the output shaft 11.

A slidable clutch member 44 is mounted on the output shaft 11 adjacent to the fixed clutch member 43. The slidable clutch member 44 has a concave friction surface engageable with the friction member 39. A pin 46 fixed on the output shaft 11 is fitted in an axially extending groove 44a formed in the bore of the slidable clutch member 44, so that the slidable clutch member 44 rotates with the output shaft 11 and can slide axially. Alternatively, the slidable clutch member 44 may be mounted on the output shaft 11 by, for example, splines or other mounting means which realize the above-mentioned rotation and slide of the slidable clutch member.

A clutch spring 47 is interposed between the fixed clutch member 43 and the slidable clutch member 44. The clutch spring 47 urges the slidable clutch member 44 away from the fixed clutch member 43.

To actuate the slidable clutch member 44, a fork 49 is disposed which contacts the opposite side of a thrust bearing 48 to the slidable clutch member 44. The fork 49 is pivotably supported by the upper and lower casing halves 19A and 19B, with the upper and lower ends of the fork shaft being inserted into holes of the cylindrical support 50, 51 that are formed on the upper and lower casings. The fork 49 pivots with these supports 50 and 51. The upper support 50 projects out of the upper casing half 19A. A clutch arm 17 is attached at the upper end of the support 50. The fork 49 may be made of a metal sheet.

When the operating arm 16 of the handle 15 is grasped, the clutch arm 17 is pivoted due to the tension of a clutch cable 18 to thereby pivot the fork 49. Then the thrust bearing 48 and the slidable clutch member 44 are pushed toward the fixed clutch member 43 against the spring force of the clutch spring 47.

As described, the above clutch is of the dead-man type, wherein the friction surface 45 of the slidable clutch member 44 is usually out of contact with the friction member 39 of the large gear 38 by the force of the clutch spring 47. When the operating arm 16 shown in FIG. 1 is grasped by the operating handle 15, the clutch arm 17 and therefore the fork 49 is pivoted via the clutch cable 18 to thereby slide and push the thrust bearing 48 toward the slidable clutch member 44, so that the friction surface 45 engages with friction the friction member 39 to engage the clutch.

It is also possible to obtain a desired partial slipping engagement of the clutch by appropriately grasping the operating arm 16 to regulate the amount of movement of the slidable clutch member 44 on the output shaft 11 and therefore the pressing force of the friction surface 45 against the friction member 39.

To start the lawn mower 1 shown in FIG. 1, the engine is started up with the operating arm 16 being released. The clutch is engaged with partial slipping engagement by gradually grasping the operating arm 16 to thereby start the lawn mower smoothly.

To turn the lawn mower 1 to a great extent or pull back the mower 1, the clutch is temporarily disengaged for easy operation thereafter.

Next, the second embodiment of the transmission of the present invention is described below with reference to FIGS. 9–13. Similar reference numerals are used in the second embodiment for the same or similar parts as in the first embodiment.

Figure 9:
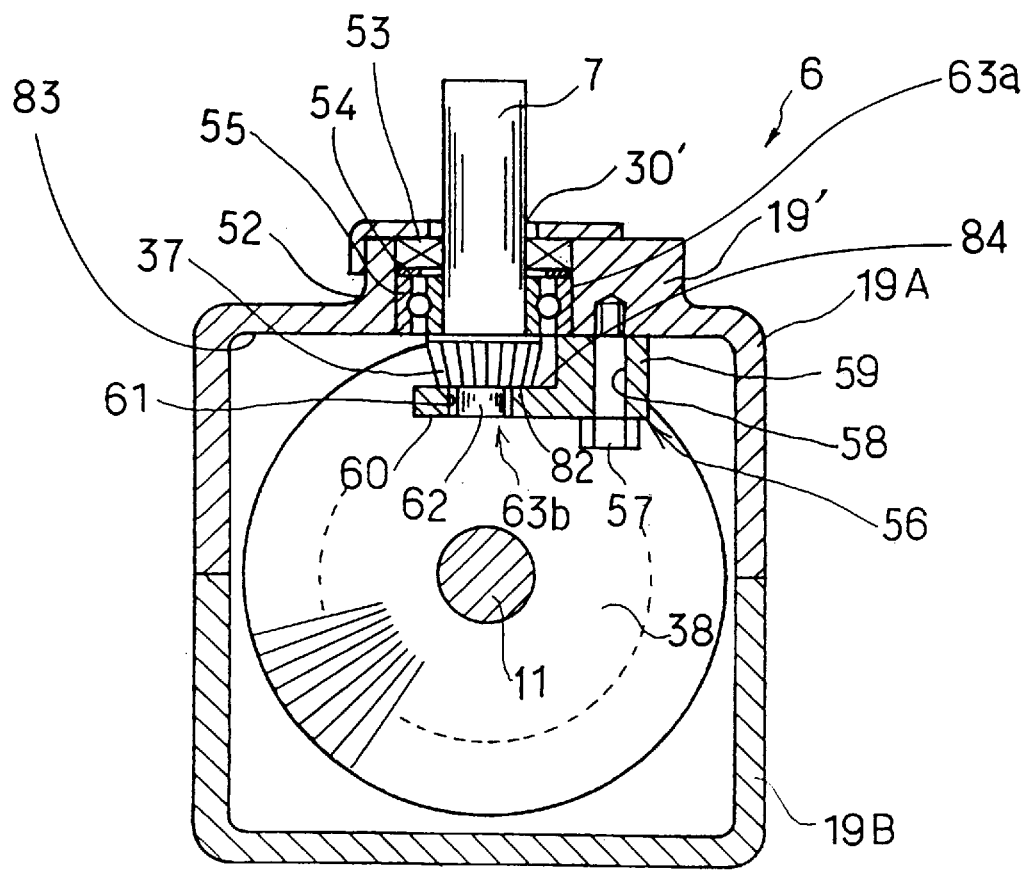
FIG. 9 is a vertical cross section schematically showing the internal structure of the second embodiment of the transmission of the present invention.
Figure 10:
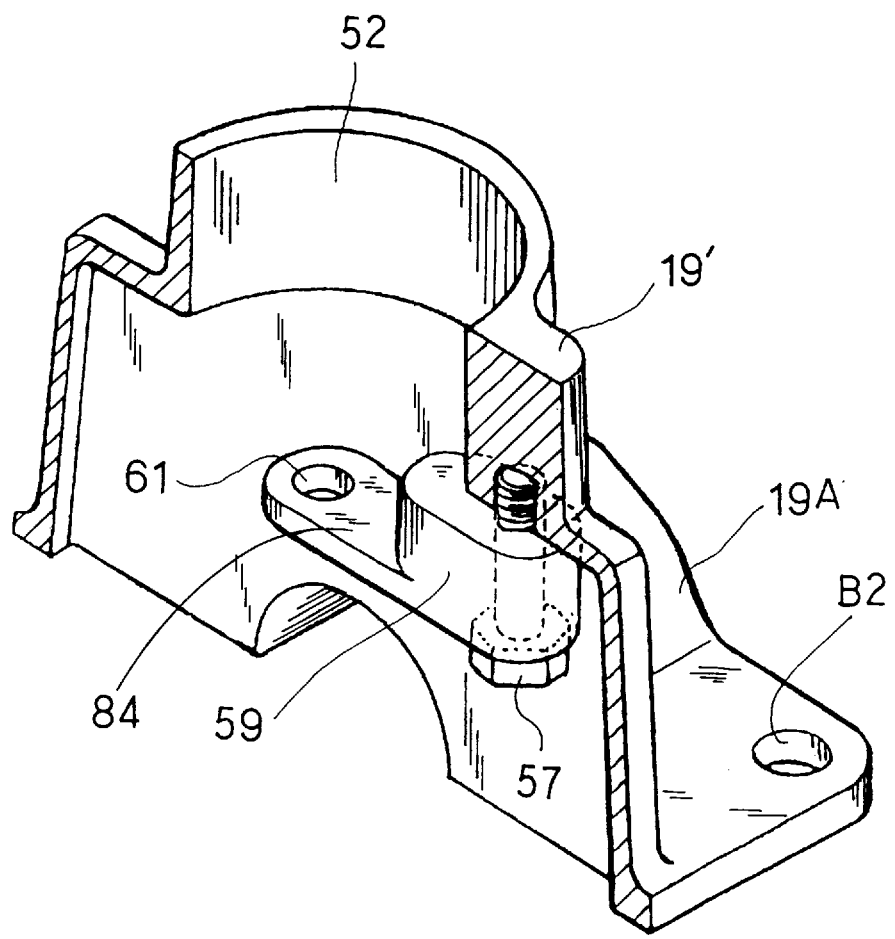
FIG. 10 is an enlarged and partially cutaway perspective view of the bearing means of the transmission of FIG. 9.

FIGS. 9 and 10 are a vertical section and a partial cutaway perspective view showing the main parts of the second embodiment of the present invention.

The basic difference between the second embodiment and the first embodiment is that a bearing means 63 for receiving the input shaft 7 is a separate component and attached to the upper casing half 19A.

The input shaft 7 is inserted into a hollow cylindrical portion 52 formed on the upper casing half 19A. The input shaft 7 passes through an oil seal 53, a spacer ring 54 and a radial bearing 55.

A generally L-shaped supporting member 56 is fixedly attached by a bolt 57 to the inner top wall of the upper casing half 19A. The supporting member 56 comprises a base portion 59 provided with a bolt hole 58 and an arm portion 60 horizontally extending from the base portion 59.

Figure 11:
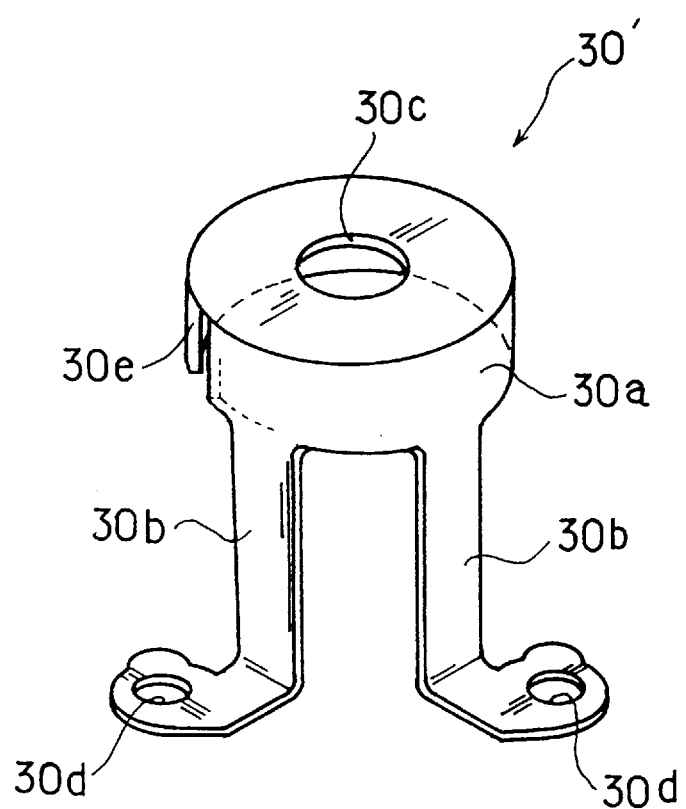
FIG. 11 is an enlarged perspective view showing the pressure member of FIG. 9.

A part of the upper end face of the base portion 59 contacts the inner top wall of the casing half 19A and the remaining part of the upper end face contacts the lower end face of the radial bearing 55. Thereby, the oil seal 53, the spacer ring 54 and the radial bearing 55 are supported from below. The upper end of the cylindrical porion 52 is closed by a pressure plate 30'. These components form an upper bearing structure 63a. As shown in FIG. 11, the pressure plate 30' is the same with the above-mentioned pressure member 30, except that it is provided with a cutout 30e for receiving a thicker portion 19' (see FIG. 10) of the casing.

Figure 12:
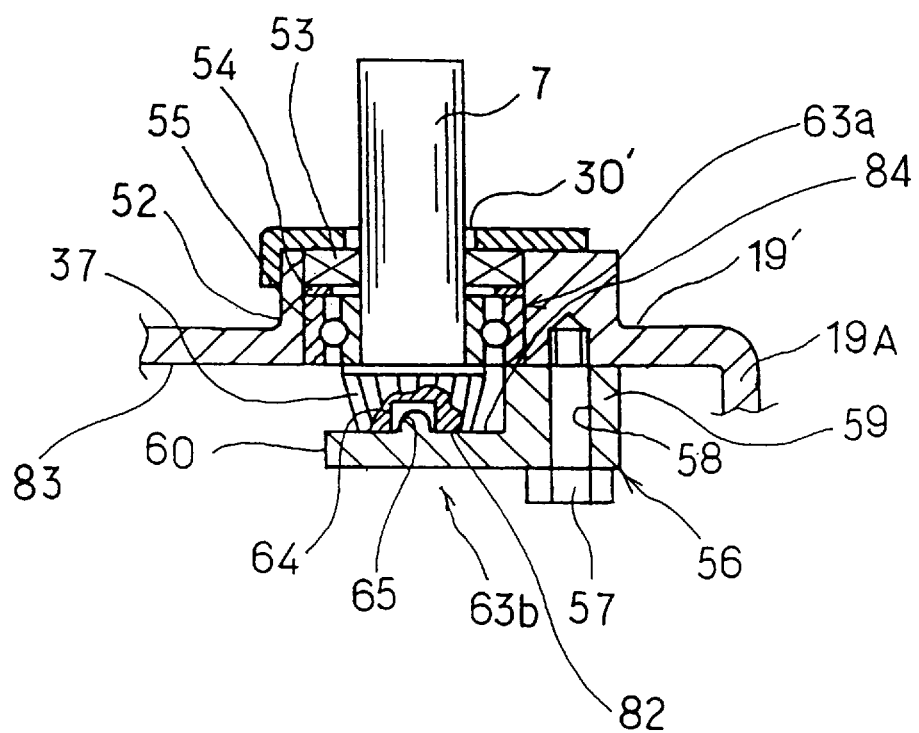
FIG. 12 is an enlarged cross section showing another embodiment of the bearing means of the transmission of FIG. 9.
Figure 13:
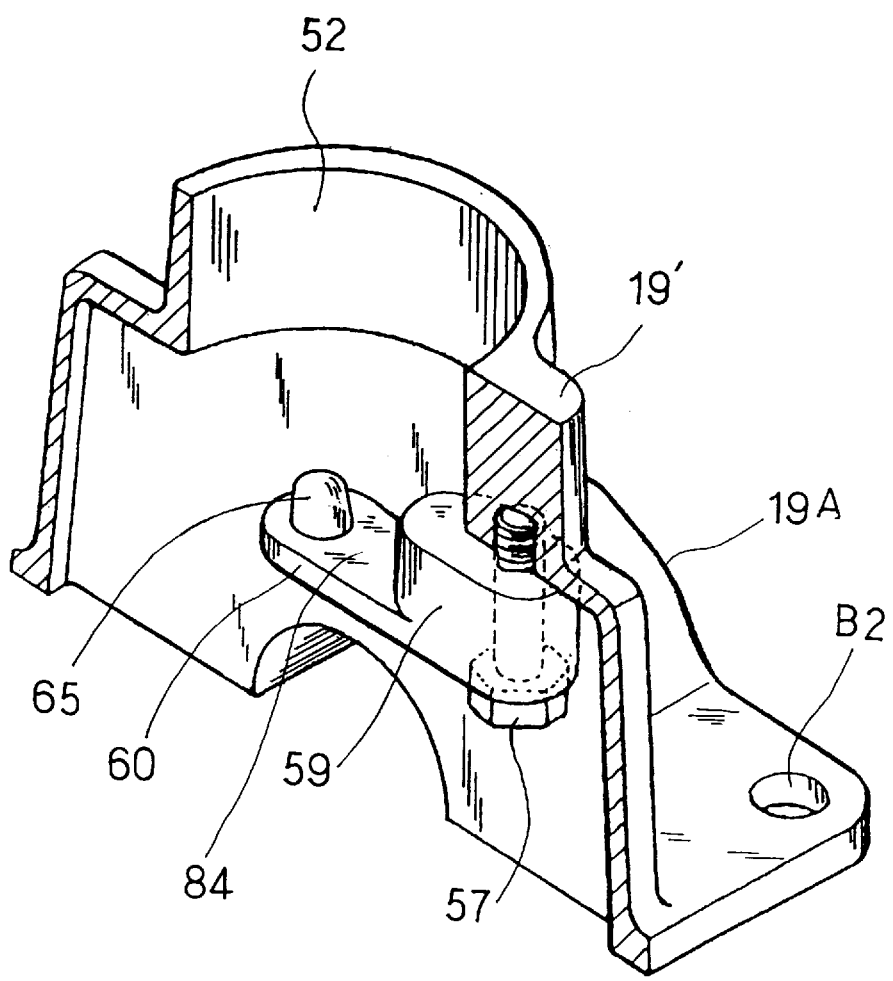
FIG. 13 is an enlarged perspective view showing the bearing means of FIG. 12.

Formed near the end of the arm portion 60 of the supporting member 56 is an opening 61 that forms a first engaging portion. A projection 62 forming a second engaging portion is formed at the central portion of the lower end face (82) of the input shaft 7. The first and second engaging portions engage with each other, and the load of the input shaft 7 is applied on the arm portion 60. Thus, the input shaft is rotatably supported by the arm portion 60. These components form a lower supporting structure 63b. The projection 62 can be securely formed as a separate member or as an integral member on the input shaft 7. As shown in FIGS. 12 and 13, a hole 64 may be formed in the lower end face of the input shaft 7, and a projection 65 may be formed integrally with the arm portion 60 or alternatively may be formed as a separate member.

Fixedly attached at the end of the input shaft 7 is a small gear 37 in axial alignment with the input shaft 7. The small gear 37 is disposed between the radial bearing 55 and the arm portion 60.

Next, the third embodiment of the transmission of the present invention is described below with reference to FIGS. 14 to 18. Again, similar reference numerals are used for the same or similar parts as in the first and second embodiments.

The casing 19 is assembled by mating the upper and lower casing halves 19A and 19B along the horizontal separating line situated in the same plane with that of the axis of the output shaft 11.

Supporting means 66 comprises a pair of supporting legs 67, 67, each upwardly extending from the inner bottom wall of the lower casing half 19B and being integrally formed with the lower casing half 19B, an oblong supporting plate 68 being laid across the flat surfaces formed on the upper faces of the supporting legs 67, 67, and extensions 69 extending from the upper casing half 19A. When the upper and lower casing halves 19A and 19B are mated, the supporting plate 68 is pinched between the supporting leg 67 and the extension 69 (FIG. 14) and supported therebetween.

The supporting means 66 receives the load of the input shaft 7 so as to act as a lower supporting structure 70b (an upper bearing structure 70a is the same as the upper bearing structure 63a in FIG. 9). The supporting plate 68 and the input shaft 7 engage each other as in the second embodiment. In FIG. 14, the reference numeral 71 denotes a fastening bolt for fastening the upper and lower casing halves 19A and 19B.

The supporting plate 68 may preferably have a cutout 72 as viewed in the plan view (FIG. 15) in order not to interfere with the large gear 38.

Figure 18:
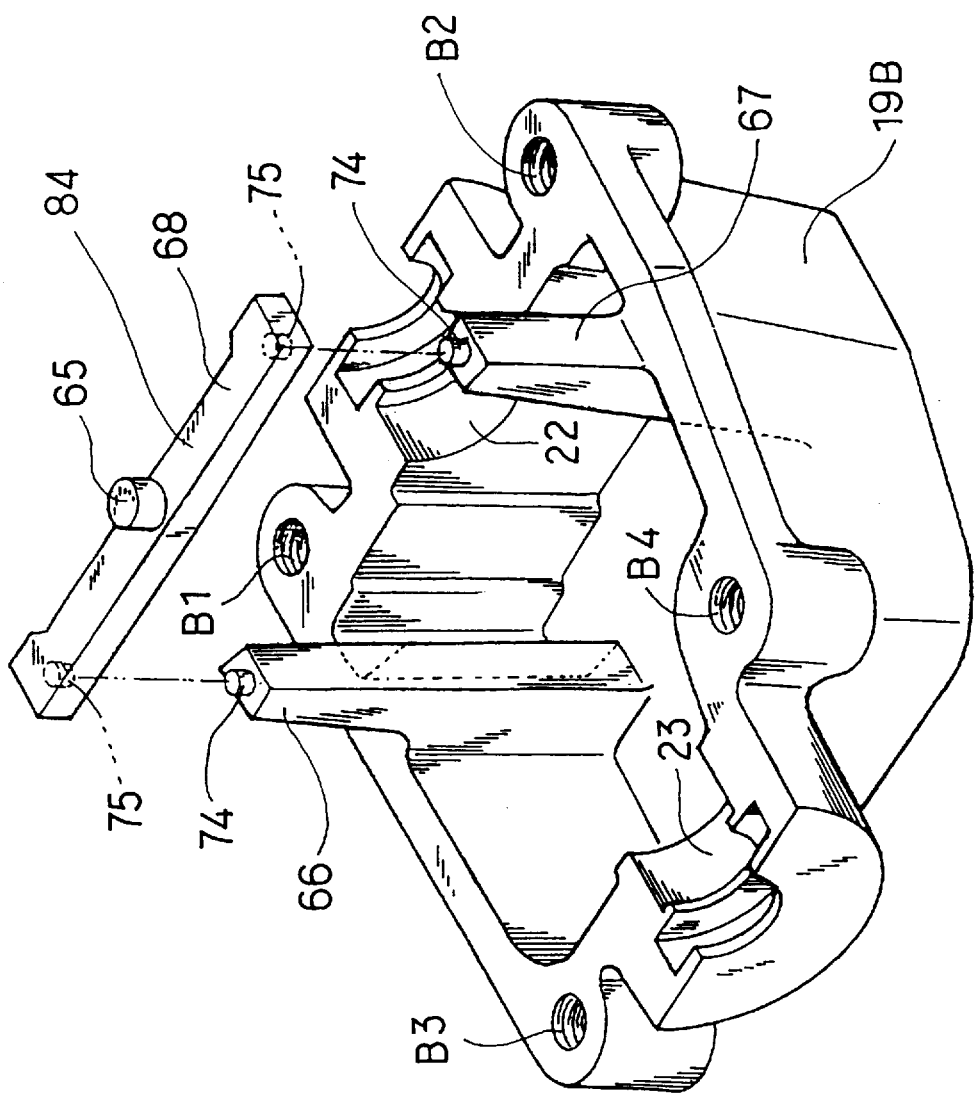
FIG. 18 is an enlarged perspective view showing the lower casing half and the supporting member of the transmission of the third embodiment.
Figure 19:
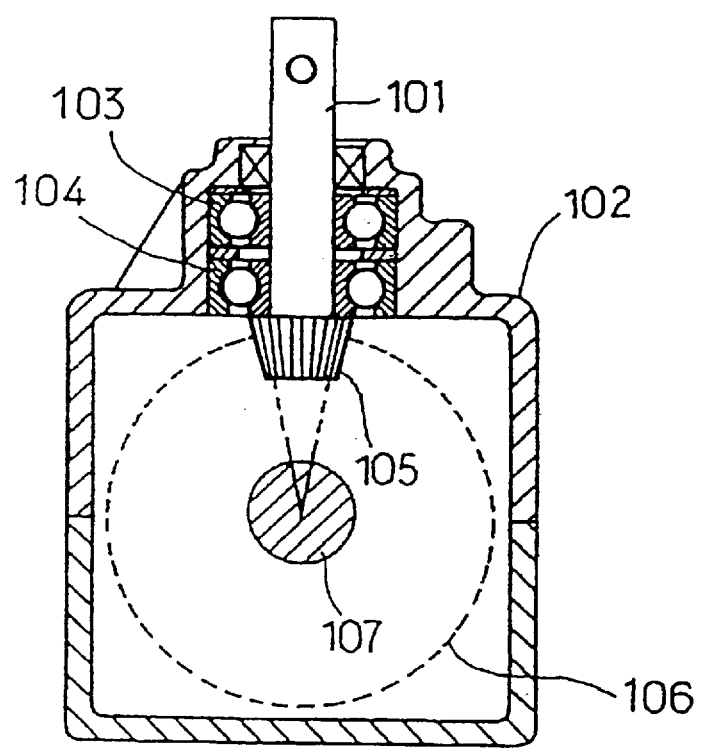
FIG. 19 is a vertical cross section schematically showing the internal structure of a conventional transmission for lawn mowers.

As shown in FIG. 18, to ensure that the supporting legs 67, 67 reliably support the supporting plate 68, projections 74 are preferably formed on the end faces of the supporting legs 67, 67, and holes 75, 75 for receiving the projections 74, 74 are preferably formed in the supporting plate 68.

Figure 16:
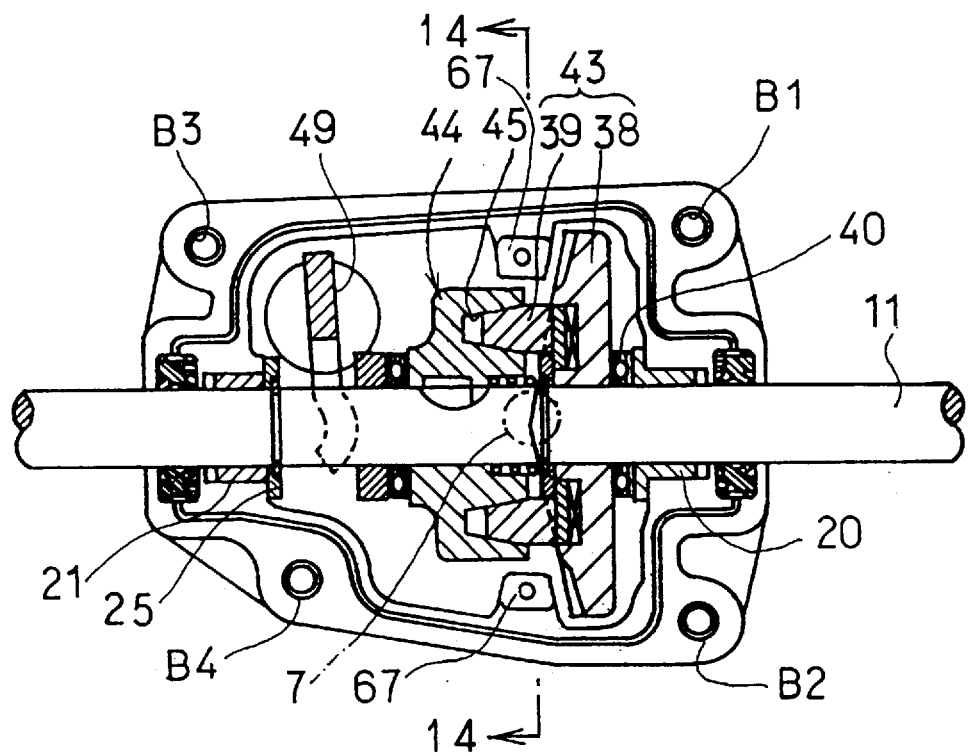
FIG. 16 is a horizontal cross section taken along the line 16—16 of the transmission of FIG. 14.
Figure 17:
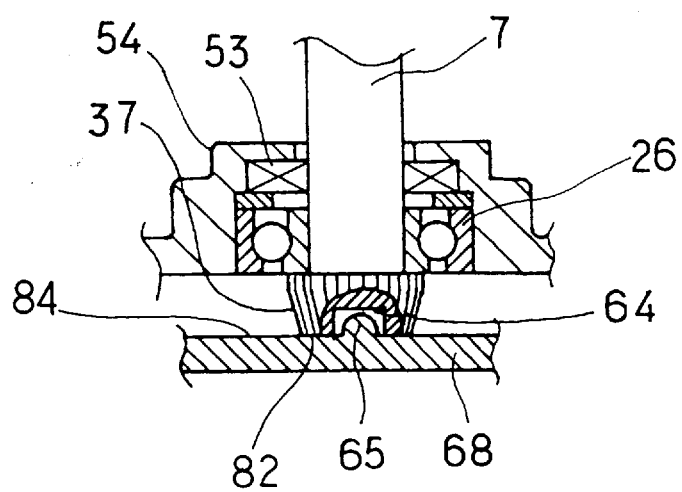
FIG. 17 is an enlarged view showing another embodiment of the supporting member of FIG. 14.

In this embodiment, as shown in FIG. 16, the toothed side of the large gear 38 is arranged to face in the reverse direction to those in the above first and second embodiments, considering the arrangement of the input shaft 7 and the supporting member 66.

As described above, according to the transmission of the present invention for self-propelled walking lawn mowers, the input shaft is supported by bearing means disposed between a small gear of the input shaft and the output shaft, and not supported by two superimposed bearings, thereby reducing the height dimension of the casing, making the lawn mower compact and further, stably supporting the input shaft.

We claim:

1. A transmission for self-propelled walking lawn mowers comprising:

a casing having an inner wall with an opening;

an input shaft having a lower end, inserted into the opening formed in the casing, said lower end having a lower end face;

an output shaft disposed perpendicular to the axis of the input shaft;

a drive gear mounted on the input shaft;

a drive gear mounted on the output shaft;

a power transmission gear mechanism for transmitting drive power from the input shaft to the output shaft via the drive gear on the input shaft and the drive gear on the output shaft; and bearing structures for supporting the input shaft, said bearing structures comprising:

an upper bearing structure disposed adjacent to and above the drive gear mounted on the input shaft; and a lower supporting structure disposed adjacent to and below the lower end of the input shaft, said lower supporting structure comprising a supporting member which projects from the inner wall of the casing to a position adjacent to and below the lower end of the input shaft, said supporting member having an upper face, wherein the lower-end face of the input shaft and the upper face of the supporting member are engaged to hold the input shaft at its horizontal position.

2. The transmission for self-propelled walking lawn mowers according to claim 1, wherein the supporting member is formed integral with the casing.

3. The transmission for self-propelled walking lawn mowers according to claim 1, wherein the supporting member is fixedly attached to the transmission casing.

4. The transmission for self-propelled walking lawn mowers according to claim 1, wherein the supporting member is pinched between mated upper and lower casing halves and held therebetween.

5. The transmission for self-propelled walking lawn mowers according to claim 1, wherein one of the lower-end face or the upper face has a vertically extending projection, and the other one has a hole receiving the vertically extending projection.

6. The transmission according to claim 1, wherein the drive gear mounted on the input shaft is smaller than the drive gear mounted on the output shaft.

* * * * *